Feb. 7, 1967     J. W. LOCKMILLER     3,302,645
CHICKEN VACCINATION AND DEBEAKING APPARATUS
Filed Nov. 22, 1963     2 Sheets-Sheet 1

INVENTOR.
Jesse W. Lockmiller
BY
Attorney

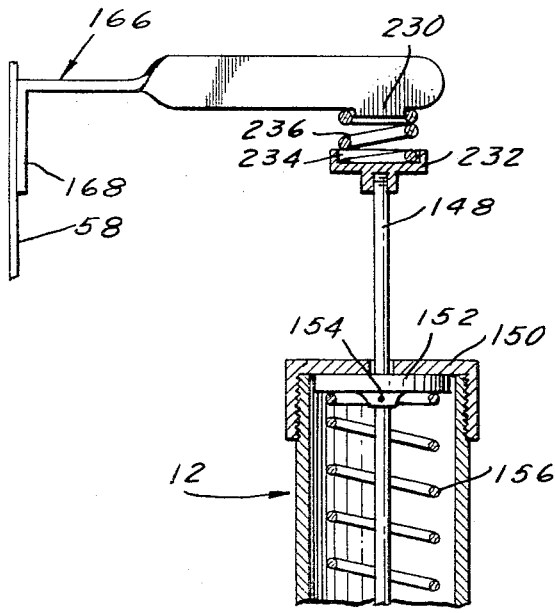
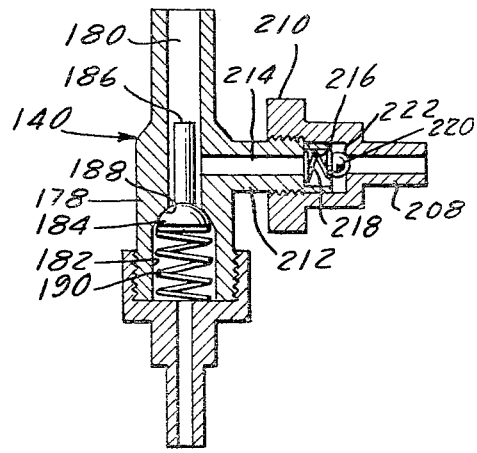
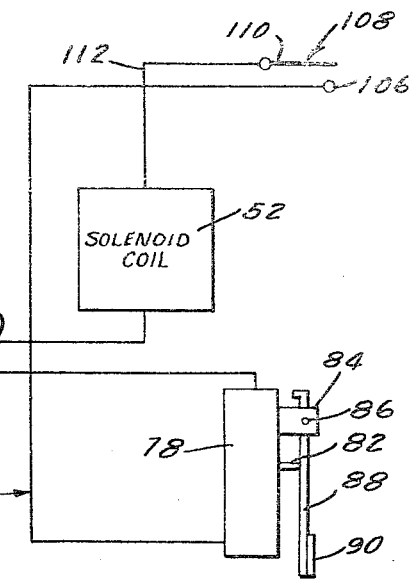
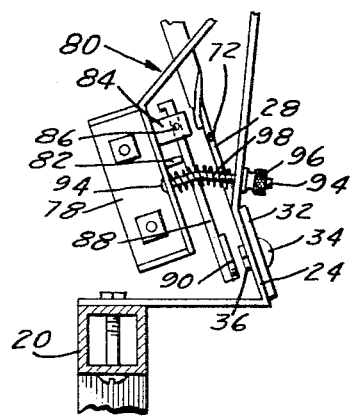

United States Patent Office 3,302,645
Patented Feb. 7, 1967

3,302,645
CHICKEN VACCINATION AND DEBEAKING
APPARATUS
Jesse W. Lockmiller, 9427 S. La Serna Drive,
Whittier, Calif. 90605
Filed Nov. 22, 1963, Ser. No. 325,599
6 Claims. (Cl. 128—223)

This invention relates generally to means for treating chickens and relates more particularly to means for treating small chickens or chicks.

While the invention has particular utility in connection with the treating of small chicks, and is shown and described in such connection, it is to be understood its utility is not confined thereto.

Various methods and means have been used for the vaccination and/or other treatment of small chicks. However, the problem of vaccinating and/or treating small chicks involves certain difficulties, particularly in large hatcheries or other establishments handling thousands of chicks. For example, the time factor in handling the chicks for vaccination and/or other medication is important and the faster the treatment can be given the lower the labor costs will be.

It is therefore an object of the present invention to provide a novel means for vaccinating chicks and/or giving them other medication.

It is another object of the invention to provide means for reducing the time element to a minimum in vaccinating and/or giving medication to the chicks.

Beak-cutting or de-beaking of chicks as young as a day old is a well recognized procedure in the scientific production of poultry for the broiler and fryer markets, and it is still another object of the present invention to vaccinate the chicks and/or give them other medical treatment when they are de-beaked.

It is a further object of the present invention to vaccinate the chicks and/or give them other medical treatment simultaneously with the severing of the beak.

It is a still further object of the invention to thus vaccinate and/or treat the chicks during the de-beaking thereof by delivering the vaccine or other medicines into the mouth of the chick simultaneously with the severing of the beak and while the chick's mouth is open for de-beaking.

It is another object of the invention to eliminate handling of the chicks twice for vaccinating and/or other medical treatment and de-beaking.

It is still another object of the invention to provide means for administering vaccine to the chicks as well as other medication orally.

Novelty resides in the means of administering medicine, and particularly vaccines, by way of the mouth of the chicks, as well as in the means of administering the vaccine and/or other medicines in combination with the de-beaking of chicks.

The characteristics and advantages of the invention are further sufficiently referred to in connection with the following detailed description of the accompanying drawings, which represent certain embodiments. After considering these examples, skilled persons will understand that many variations may be made without departing from the principles disclosed and I contemplate the employment of any structures, arrangements, or modes of operation that are properly within the scope of the appended claims.

Referring to the drawings, which are for illustrative purposes only:

FIG. 4 is a side view of a portion of the de-beaking mechanism;

FIG. 5 is a diagram of the wiring system of the present arrangement;

FIG. 6 is an enlarged sectional view showing the check-valve arrangement for the syringe; and FIG. 7 is an alternative arrangement for actuating the syringe.

Figure 1:
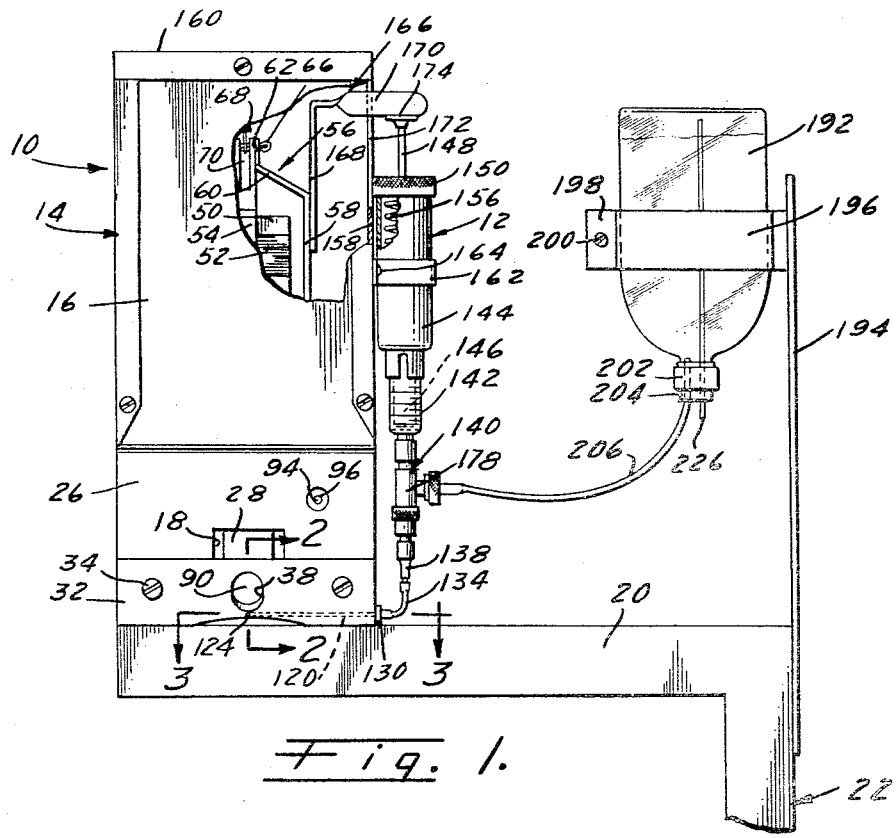
FIG. 1 is a front elevational view of apparatus or mechanism embodying the present invention with portions broken away to show the interior construction of certain portions thereof.
Figure 2:
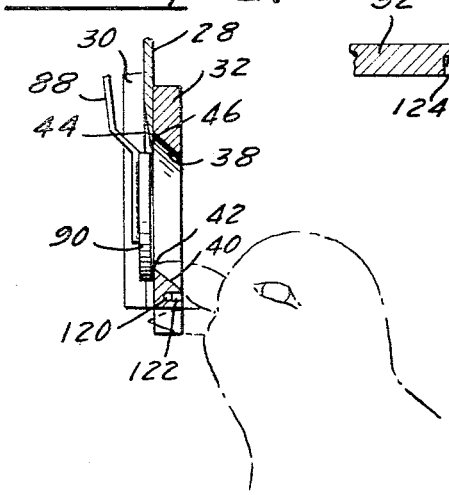
FIG. 2 is an enlarged sectional view taken on line 2—2 of FIG. 1.
Figure 3:
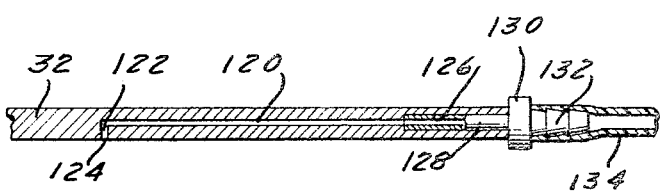
FIG. 3 is an enlarged sectional view taken on line 3—3 of FIG. 1.

Referring more particularly to the drawings, it is to be understood that the apparatus or mechanism is shown diagrammatically. The apparatus includes debeaking means indicated generally at 10 and means, indicated generally 12, for vaccinating chickens and/or giving them other medicine.

One type of de-beaking device that may be used in combination with the medicine administering apparatus or mechanism is disclosed in my Patent No. 2,886,038 issued May 12, 1959.

The de-beaking mechanism comprises upright support means, indicated generally at 14, which includes a plate 16 having a notch 18 at the lower end, said plate being attached by any suitable means, such as screws or the like, to a supporting arm 20 of a bracket, indicated generally at 22 which is, in turn, attached to a fixed support. Any other suitable supporting means for the equipment may also be used.

Notch 18 is in an upwardly and rearwardly inclined part of the plate 16 and extends upwardly into the lower portion of a substantially vertically extending part 26 of said plate to provide proper clearance for a moving cutting blade 28 slidably mounted in a guide 30 provided therefor and secured to a fixed or stationary blade member 32 attached to the part 24 of the plate by means of screws 34 provided with securing nuts 36.

Midway of the ends of the fixed blade 32 is an opening 38 of sufficient size to permit ready insertion of the beak of a bird, so that said beak may be trimmed or cut. The lower portion of said opening 38 is bevelled at the outer or forwardly facing side, thereby providing an upwardly facing crescent shaped portion 40 to provide an arcuate shaped cutting edge 42 of said fixed cutting blade 32.

At its lower end the movable blade 28 is provided with an arcuate notch 44 which tapers rearwardly to provide a sharp crescent shaped cutting edge 46 arranged oppositely of the crescent shaped cutting edge 42 and cooperable therewith.

Secured to the back of the plate 16 is a solenoid, indicated generally at 50 and comprising a solenoid coil 52 having a longitudinally extending passage therethrough in which is slidably disposed an armature 54. A frame, indicated generally at 56, has side members 58 at opposite sides of the solenoid coil 52 and in spaced relation thereto. At the upper ends side members 58 have inwardly inclined arms 60 with upwardly extending end portions 62 secured to the upper end of the armature 54, said upper end portion of said armature extending operably upwardly above the coil 52 so as to permit downward movement of said armature and frame upon energization of said coil. The means for securing the frame to the upper end of the armature may be of any suitable character but is shown as a cotterpin 66. Means for moving the frame and armature upwardly comprises a spring 68 having one end secured to the cotterpin 66 and in the space or slot 70 in the upper end of said armature. The opposite end of the spring is attached to a fixed element, not shown. The lower end of the frame has a pivotal connection 72 with the upper end of the movable blade 28 and said movable blade is moved downwardly when the solenoid coil is energized to thereby cause the cutting edges 42 and 46 of the fixed and movable cutting blades to be brought together for cutting the forward end or tip portion of the upper beak of the chicken. Means for limiting upward and downward movement of the armature 54, frame 56 and movable blade 28 is provided, said means not being shown herein.

There is means for effecting automatic operation of the mechanism and this means includes a normally open micro-switch 78 of well known character attached to a bracket 80 by means of screws or the like, not shown. Switch plunger 82 of the micro-switch 78 extends to the front of the device and is spring urged outwardly to the normally switch-open position. A pair of ears 84 extend forwardly from the front of the switch just above the plunger 82 and in laterally spaced relation to each other. A pivot pin 86 has its ends supported by said ears and extends between said ears. One end of a relatively light switch-actuating arm 88 is attached adjacent the upper end to said pivot pin 86, said arm 88 extending downwardly in front of the micro-switch 78 with the plunger 82 engaged by said arm. The lower end of the arm extends to a position behind the opening 38 of the fixed blade 32 and there is a beak-engaging contact or disc member 90 spot welded or otherwise secured to the lower end of said arm 88, directly behind the opening 38, so that said disc will be engaged by the tip of a bird's beak passed through the opening 38, thereby actuating arm 88 and hence plunger 82 to close the micro-switch and effect energization of the solenoid which in turn snaps the movable blade 28 downwardly to cut off the free end portion of the beak which extends through said opening 38.

Means for adjusting the beak contact disc or plate 90 toward and away from the cutting blades is provided and includes a screw 94 received in an opening provided therefor in a part of the bracket 80. The screw is bent slightly downwardly and the forward portion of the screw extends to an opening provided therefor in the plate 16, there being a nut 96 on said screw at the forward side of the plate 16 to effect adjustment of the micro-switch toward and away from the plate 16. A spring 98 is disposed on the screw 94 between adjacent parts of the bracket 80 and plate 16 to urge the bracket portion 84 rearwardly. The bracket is somewhat resilient so that there will be some flexing thereof to effect the above described adjustment of the switch 78 and the arm 88.

The electric circuit for the mechanism is shown diagrammatically in FIG. 5, lines 100 and 102, being connected to a suitable source of electric power current. Line 100 is connected to one side of the micro-switch 78, the other side of said switch 78 having a connection 104 with a fixed contact member 106 of a switch 108. Switch 108 has a movable switch member 110 connected to one end of the solenoid coil 52, the other end of said coil 52 being connected to the wire 102. With this arrangement, when the movable contact 110 of switch 108 is moved into engagement with the contact 106, the energization of coil 52 is controlled by the micro-switch 78 and every time the arm 88 is actuated clockwise, as shown in FIGS. 4 and 5, the coil 52 is energized and the movable blade 28 actuated. Upon release of the arm 88 the coil 52 is de-energized and spring 68 raises the blade carrying the frame and blade to the normal raised position.

Fixed blade 32 is provided with a fluid passage 120 which extends longitudinally from end of said blade. At the inner end of passage 120 there is a forwardly extending discharge passage 122 in the fixed blade 32, said discharge passage 122 having a discharge orifice 124 which opens just below the bevelled portion 40 of the opening 38 and directly in line with the mouth of a chicken having its upper beak projected into said opening 38. At its outer end the passage 120 is enlarged or counterbored, as at 126, for reception of a nipple 128 of a fixture 130 having a serrated outer end portion 132 for reception of the adjacent end of a flexible conduit or tube 134 of any suitable material, such as rubber, plastic, or the like, that will not be affected by vaccines, medicines or the like flowing therethrough.

The other end of the flexible conduit 134 is connected to a fixture 138 of any suitable well known character, said fixture being connected to one end of check valve means, indicated generally at 140. The other end of check valve means 140 is connected by any suitable well known means to the lower end of a barrel 142 of syringe 12. Barrel 142 is at the lower end of a cylindrical body 144 of the syringe. A piston 146 is operably disposed in the barrel 142 and is attached at the lower end of a rod 148 which extends upwardly through the body 144. There is a cap 150 screwed or otherwise attached to the upper end of the body 144, said cap being provided with an opening therethrough for slidable reception of the rod 148. There is a spring retainer 152 secured to said rod by any suitable means, such as a pin 154, and a spring 156 reacts between the bottom of the body 144 and said spring retainer to urge the rod 148, and hence the piston 146, upwardly, upward movement of said rod and piston being limited by engagement of the spring retainer 152 with the cap or cover 150.

Syringe 12 is secured to the plate 16 or to one side 158 of a cover at the back of plate 16 which protects the operating mechanism by means of a band or strap 162 secured to said side 158 by screws 164 or the like.

There is a bracket, indicated generally at 166 having a vertical arm 168 secured to one of the side members 58 of the frame 56 by spot welding or any other suitable means. At the upper end of arm 168 there is a laterally turned arm 170 which extends to a vertical slot 172 in the wall 158 and engages the upper side of a pressure button 174 screwed onto the upper end of the rod 148 or otherwise secured thereto. Downward movement of the frame 56 effects downward movement of the bracket 166 and hence downward movement of the rod 148 and piston 146 to effect discharge of fluid from the barrel 142. Upward movement of said rod and piston 146 is effected by the spring 156. Check valve means 140 is provided with a vertical tubular body 178 having a fluid passage 180 therein terminating at its lower end in an enlarged passage 182 in which a movable check valve member 184 is disposed and held in position by a stem 186 extending upwardly into the passage 180, said stem 186 being of smaller external diameter than the internal diameter of said passage 180, so that fluid may flow therepast. The valve member 184 is adapted to seat on the valve seat 188 at the upper end of the enlarged portion 182 but is sufficiently smaller than said passage portion 182 to permit fluid to flow therepast when said valve member is unseated. The spring 190 urges valve member 184 to the seated position but yields when pressure is applied to the upper end of said valve member 184 to permit fluid to flow into the passage 120 in the fixed blade 32 and be discharged from the orifice 124 when the rod 148 and piston 146 are moved downwardly. Reverse flow is prevented by the seating of valve member 184 when the pressure above said valve member is relieved, as when fluid is drawn into the barrel 142 from a reservoir 192 which is secured to an upright support 194 attached to the bracket 22 by any suitable means, such as screws or the like, not shown. The means for securing the reservoir to the support 194 comprises a band 196 having the end portions 198 secured together by a screw 200. This is just one arrangement for mounting the reservoir 192, it being understood that any other suitable means may be used for this purpose.

Reservoir 192 is shown as a bottle having a reduced diameter neck 202 with a stopper 204 therein having a passage therein for reception of one end of a conduit 206, the other end of said conduit being attached to a nipple 208 of a fixture 210 screwed onto a laterally extending part 212 of the check valve means. The conduit 206 may be of any suitable character and may be flexible. The lateral extension 212 has a passage 214 therethrough connected with the passage 180 above the valve member 184 and there is an enlarged diameter 216 at the outer end of passage 214 for reception of a spring 218 which reacts against a shoulder at the inner end of the counterbore 216 and yieldingly urges a movable check valve member, comprising a ball, against a seat 222 at the inner end of the nipple 208. Thus fluid may be drawn into the passage 180 and thence to the barrel 142 of the syringe from the reservoir 192 but is prevented from counterflow. It is to be noted that the reservoir 192 has a tube 226 which extends upwardly through the stopper 204 and terminates at the upper end of the reservoir 192 to admit atmospheric pressure to the upper end of said reservoir.

With this arrangement when the piston 146 moves upwardly in the barrel 142 of the syringe, fluid, which may be vaccine and/or other medicine, is drawn from the reservoir into the passage 180 and thence to the barrel 142, check valve member 220 being moved from its seat to permit such fluid to enter passage 180. At the same time the check valve member 184 remains closed. When the piston 136 moves downwardly the check valve 220 closes and the movable valve member 184 opens so that the fluid is discharged from the orifice 124 and into the mouth of a chicken having the tip of its upper beak cut off.

With this arrangement the solenoid of the de-beaking mechanism functions both as a means for actuating the blade 28 for cutting action and also as the actuator for the syringe to effect discharge of fluid from the discharge port or orifice 124.

In the arrangement shown in FIG. 7, the arm 170 of bracket 166 has a spring retainer 230 secured to the under side by welding or other suitable means and the button at the free end of the rod 148 comprises a spring retainer 232 having a recess 234 therein for reception of one end of a spring 236, the other end of said spring being held in place by the spring retainer 230. When the solenoid is energized to effect downward movement of the frame thereof the bracket 166 moves downwardly and spring 236 serves as a resilient connection between the bracket 166 and the rod 148 and hence the piston 146 of the syringe.

It will be apparent from the foregoing that every time the blade 28 is actuated there is a discharge of vaccine or other medicine into the mouth of the chick and when the armature 54 of the solenoid is raised by spring 68 the spring 156 of the syringe moves the rod 148 and hence the piston 146 upwardly to recharge the barrel 142 of the syringe with vaccine and/or other medicine from the reservoir 192. This operation is automatic and both the de-beaking and vaccination of the chicken is effected at the same time and it is unnecessary to handle the chicken twice, once for de-beaking and once for the vaccination and/or other treatment with medicine.

While the blade 28 and the syringe are actuated by the solenoid 52, it is to be understood that a separate actuating mechanism may be used for the syringe. Further, the blade and syringe may be operated by the two actuating mechanisms simultaneously and/or independently of each other.

Also there can be a tube and discharge orifice or nozzle independent of the cutting blades.

In referring to medicines or medicaments it is to be understood that these terms include vaccines and antibiotics as well as other medicines.

When the beak portion is cut off there is a small drop of blood left in the chick's mouth and the injection of vaccine and/or other liquid medicine into the chick's mouth when the beak portion is cut off mixes with this drop of blood and thins it so that the chick can easily swallow the thinner liquid in its mouth.

The invention and its attendant advantages will be understood from the foregoing description and it will be apparent that various changes may be made in the form, construction and arrangement of the parts of the invention and method steps thereof without departing from the spirit and scope thereof, or sacrificing its material advantages, the arrangements and steps of the method hereinbefore described being merely by way of example, and I do not wish to be restricted to the specific forms or steps shown or uses mentioned except as defined in the accompanying claims, wherein various portions have been separated for clarity of reading and not for emphasis.

I claim:
1. In apparatus of the character described:
(A) mechanism support means comprising an upright plate having a notch that extends upwardly from the lower edge of said plate;
(B) a stationary blade member secured to the plate and over said notch, said member having an opening therein with an arcuate, upwardly facing sharp cutting edge at the inner face of said member;
(C) a movable blade having an arcuate notch in the lower end curved oppositely of the cutting edge of the fixed blade member, said movable blade being operably mounted for cooperative cutting action with the fixed blade;
(D) actuating means for actuating said movable blade;
(E) means for discharging fluid medicament forwardly of said fixed blade and below the sharp cutting edge thereof;
(F) and means connecting said actuating means with said fluid discharge means whereby said fluid discharge means is actuated by said actuating means for discharging fluid.

2. In apparatus of the character described:
(A) mechanism support means;
(B) a fixed blade member secured to said support means, said member having a sharp cutting edge;
(C) a movable blade having a cutting edge, said movable blade being operably mounted for cooperative cutting action with the fixed blade;
(D) means for actuating said movable blade;
(E) and means for discharging fluid medicament forwardly of said fixed blade and below the sharp cutting edge thereof.

3. The invention defined by claim 2, wherein the means for discharging fluid medicament is simultaneous with the actuation of said movable blade in the cutting direction.

4. Apparatus for treating chickens, comprising:
(A) an upright plate having an opening therein;
(B) a stationary blade member secured to said upright plate and having a cutting edge, said stationary blade member having a fluid passage therein terminating in a forwardly projecting discharge portion having a discharge port at the forward end just below the cutting edge of said stationary blade member;
(C) a movable blade slidably mounted with respect to said stationary blade and having a cutting edge cooperable with the cutting edge of said stationary blade;
(D) electrically operable means for actuating said movable blade in the cutting direction;
(E) yielding means urging the movable blade in the opposite direction;
(F) means for controlling the actuator means, including a switch having an actuating arm;
(G) support means for said switch supporting same in a position whereat the arm thereof is operably positioned behind the blades for operable engagement by the beak of a bird when said beak is placed in the cutting position;

(H) a syringe including a tubular body attached to the support means, a barrel, a plunger rod extending upwardly of the body and having a piston operably disposed in said barrel;

(I) means connecting the discharge end of the barrel with the inlet end of the passage in the stationary blade member;

(J) a reservoir for medicine in fluid form operably supported adjacent said syringe;

(K) tubular means connecting the lower end of the reservoir with the means connecting the discharge end of the barrel with the inlet end of the passage in the stationary blade member;

(L) check valve means permitting fluid to be drawn into the barrel of the syringe from said reservoir with upward movement of the plunger and piston thereof but preventing return flow to said reservoir, and permitting discharge of fluid from said barrel to the passage in said stationary blade member upon downward movement of the plunger but preventing reverse flow;

(M) yielding means urging the plunger upwardly;

(N) and means connecting the electrically operable means with said plunger rod for moving said plunger downwardly upon energization of said electrically operable means.

5. The invention defined by claim 4, including a resilient connection interposed between the electrically operable means and said plunger rod.

6. In apparatus of the character described:
(A) mechanism support means;
(B) beak removing means adapted to be actuated for removing a portion of the beak of a bird;
(C) fluid discharge means for discharging fluid medicament, said means having a discharge outlet for directing medicament into the mouth of a bird positioned for removal of a portion of its beak;
(D) and control means for controlling the operation of the beak removing means and the fluid discharge means whereby medicament is discharged into the mouth of the bird when the beak removing means is operated.

References Cited by the Examiner
UNITED STATES PATENTS 2,886,038   5/1959   Lochmiller _____ 128—305

OTHER REFERENCES

Methods of Examination of Poultry Biologics, 167–78V–N (publication No. 70 of the National Academy of Sciences National Research Council, pages 3 and 39 in particular relied upon).

RICHARD A. GAUDET, *Primary Examiner.*

G. McNEILL, *Assistant Examiner.*